(12) United States Patent  
Miernik

(10) Patent No.: US 6,975,863 B1  
(45) Date of Patent: Dec. 13, 2005

(54) SYSTEM AND METHOD FOR SELECTING A WIRELESS SERVING NODE

(75) Inventor: Jerzy W. Miernik, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 312 days.

(21) Appl. No.: 10/015,334

(22) Filed: Dec. 11, 2001

(51) Int. Cl.[7] ............................................ H04Q 7/20
(52) U.S. Cl. ................. 455/434; 455/435.1; 455/435.2; 455/414.1; 455/432.1
(58) Field of Search .............................. 455/434, 435.1, 455/435.2, 435.3, 414.1, 414.2, 414.3, 432.1

(56) References Cited

U.S. PATENT DOCUMENTS

| | | | |
|---|---|---|---|
| 6,665,537 B1 | 12/2003 | Lioy .......................... | 455/435 |
| 2002/0068565 A1 * | 6/2002 | Pumadi et al. .............. | 455/436 |
| 2002/0114293 A1 * | 8/2002 | Madour et al. ............. | 370/329 |
| 2002/0177438 A1 * | 11/2002 | Sakai et al. ................. | 455/432 |

FOREIGN PATENT DOCUMENTS

| | | |
|---|---|---|
| EP | 0 987 860 A2 | 3/2000 |
| WO | WO 01/38983 A2 | 5/2001 |

OTHER PUBLICATIONS

"Digital cellular telecommunications system (Phase 2+) (GSM); Universal Mobile Telecommunications System (UMTS): General Packet Radio Service (GRPS); Service description; Stage 2," (3GPP TS 23.060 version 3.6.0 Release 1999) XP 02198494, ETSI TS 123 060 V3.6.0 (Jan. 2001), *European Telecommunications Standards Institute*, Jan. 2001, 184 pages.

International Search Report in International Application No. PCT/US 02/39596, dated Apr. 28, 2003, 7 pages.

* cited by examiner

*Primary Examiner*—Joseph Feild  
*Assistant Examiner*—Huy Nguyen  
(74) *Attorney, Agent, or Firm*—Baker Botts L.L.P.

(57) ABSTRACT

A system and method for selecting a wireless serving node include the capability to receive a wireless registration request at a wireless serving node and to determine whether the serving node is managing a wireless session associated with the registration request. The system and method also include the capability to generate a wireless session inquiry if the serving node is not managing a wireless session associated with the registration request, to receive a wireless session response containing a serving node identifier, and to generate a wireless registration response containing the serving node identifier.

53 Claims, 6 Drawing Sheets

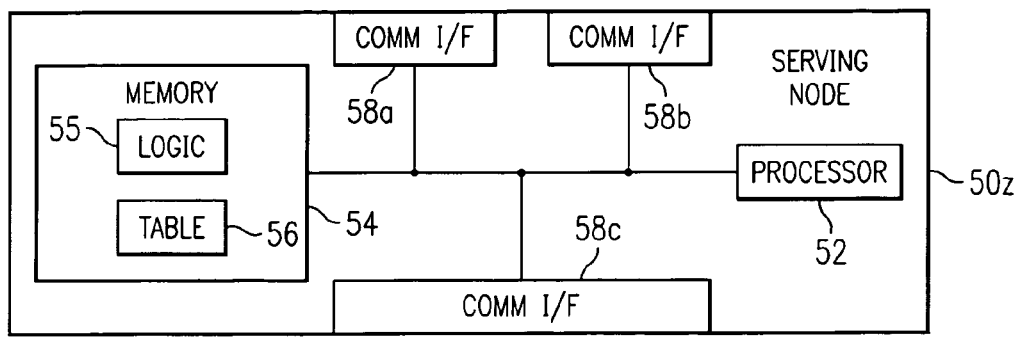
FIG. 2
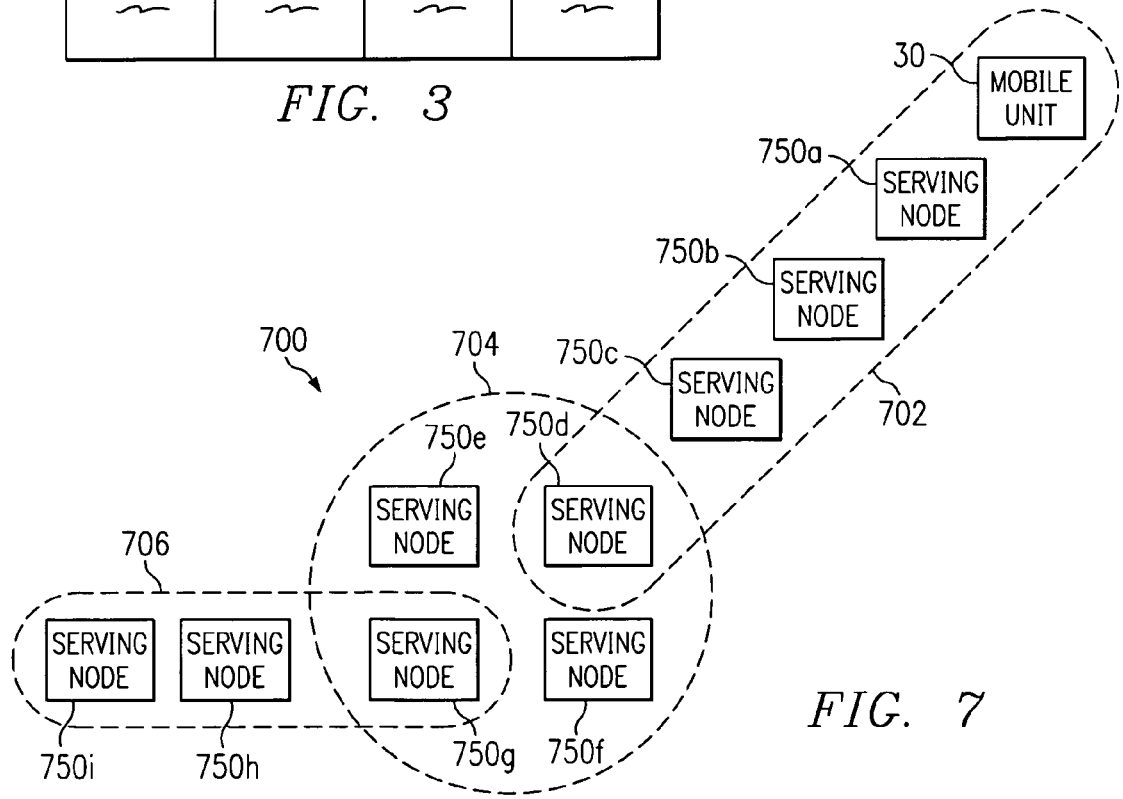
FIG. 3
FIG. 7

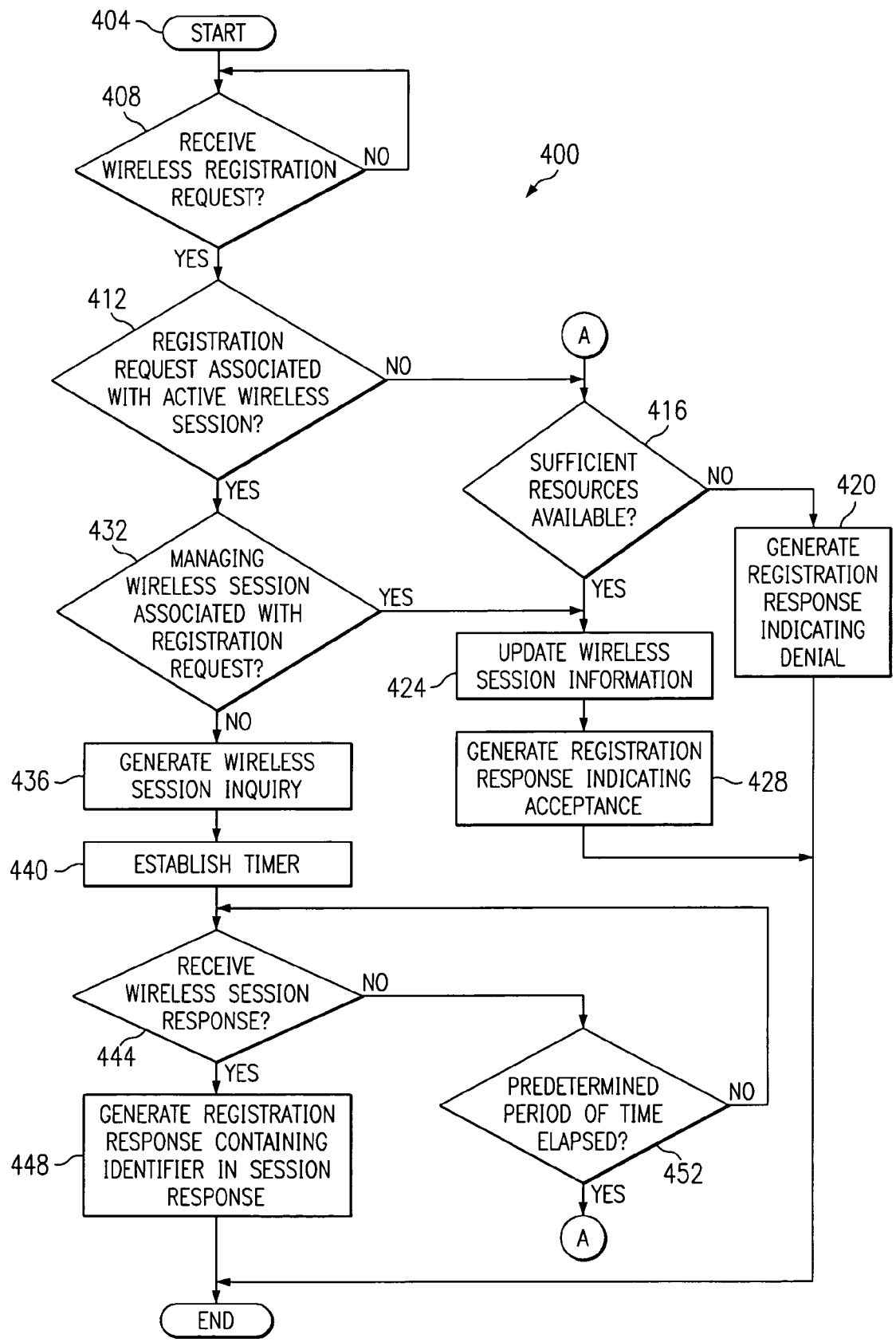

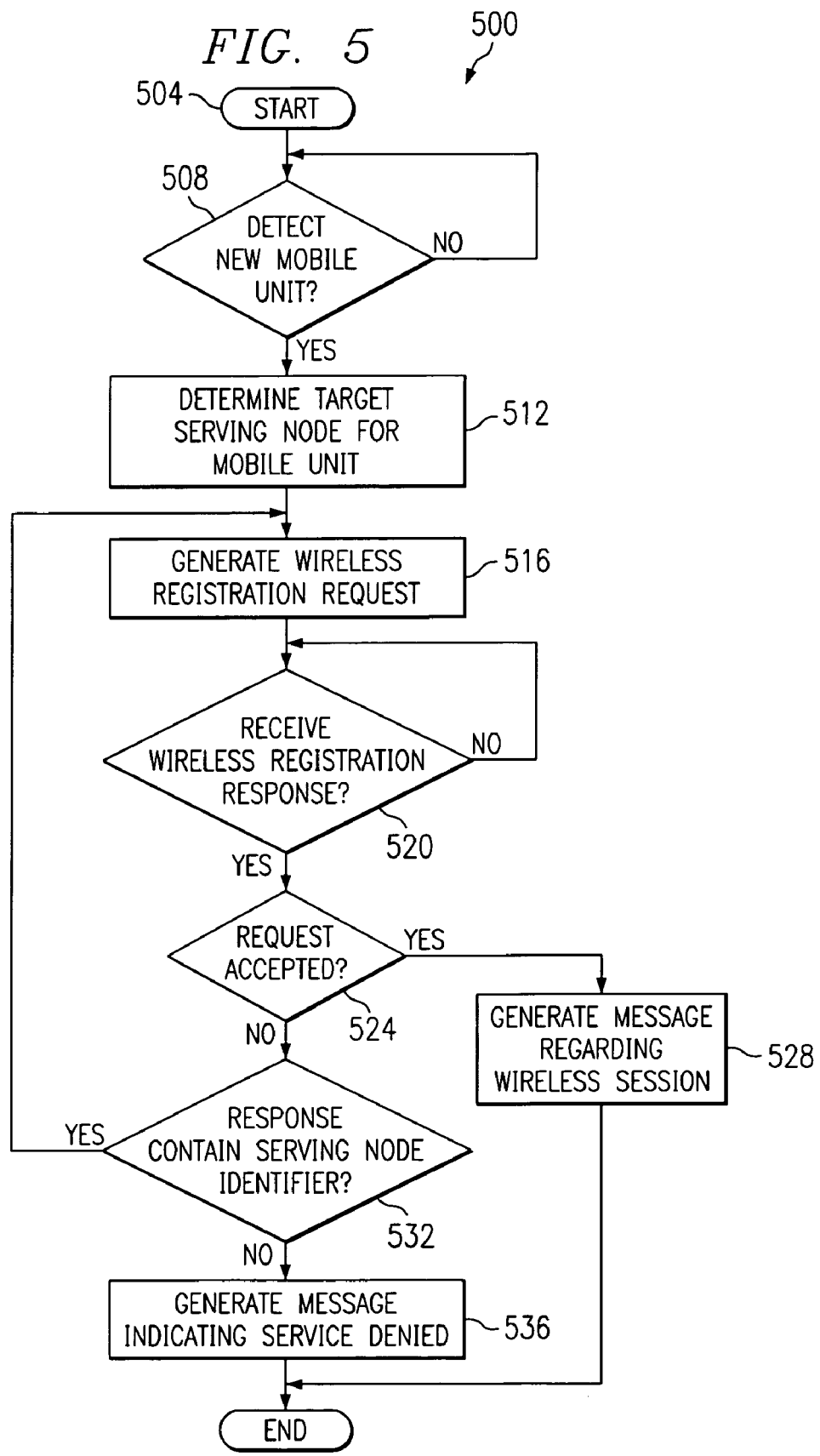

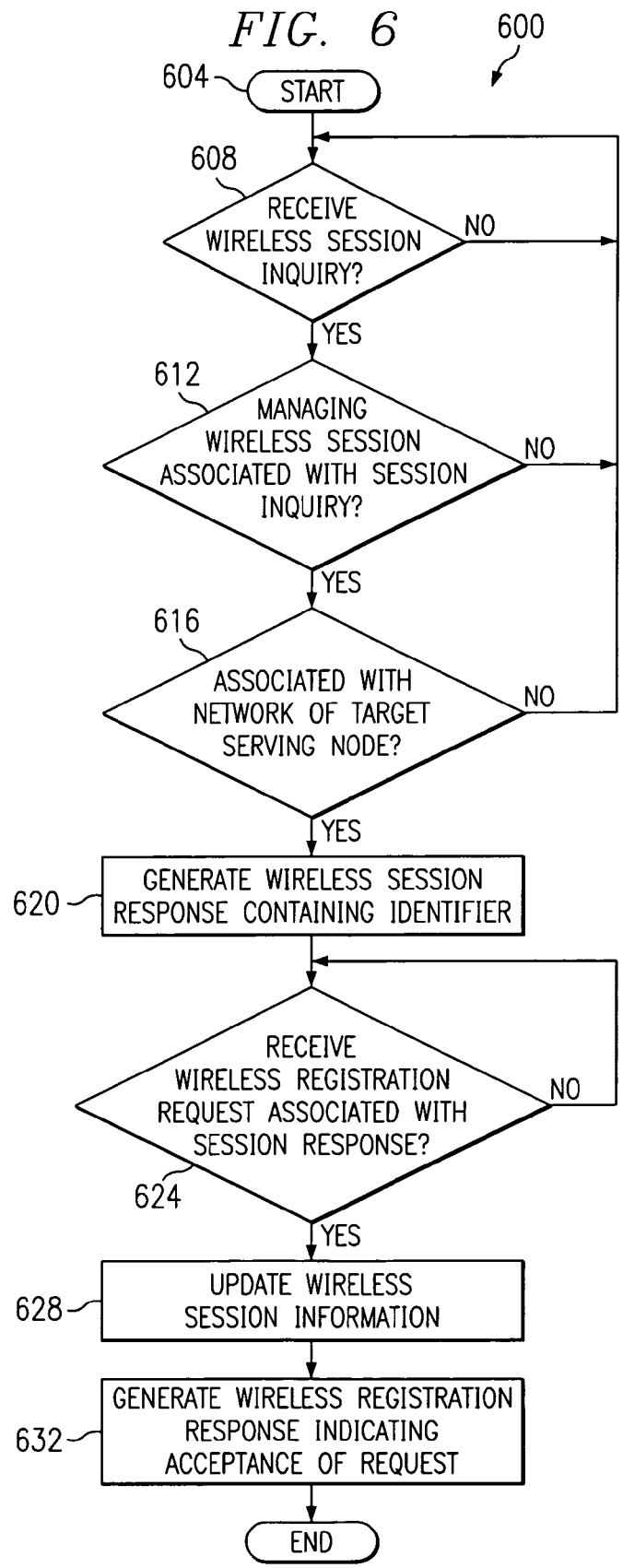

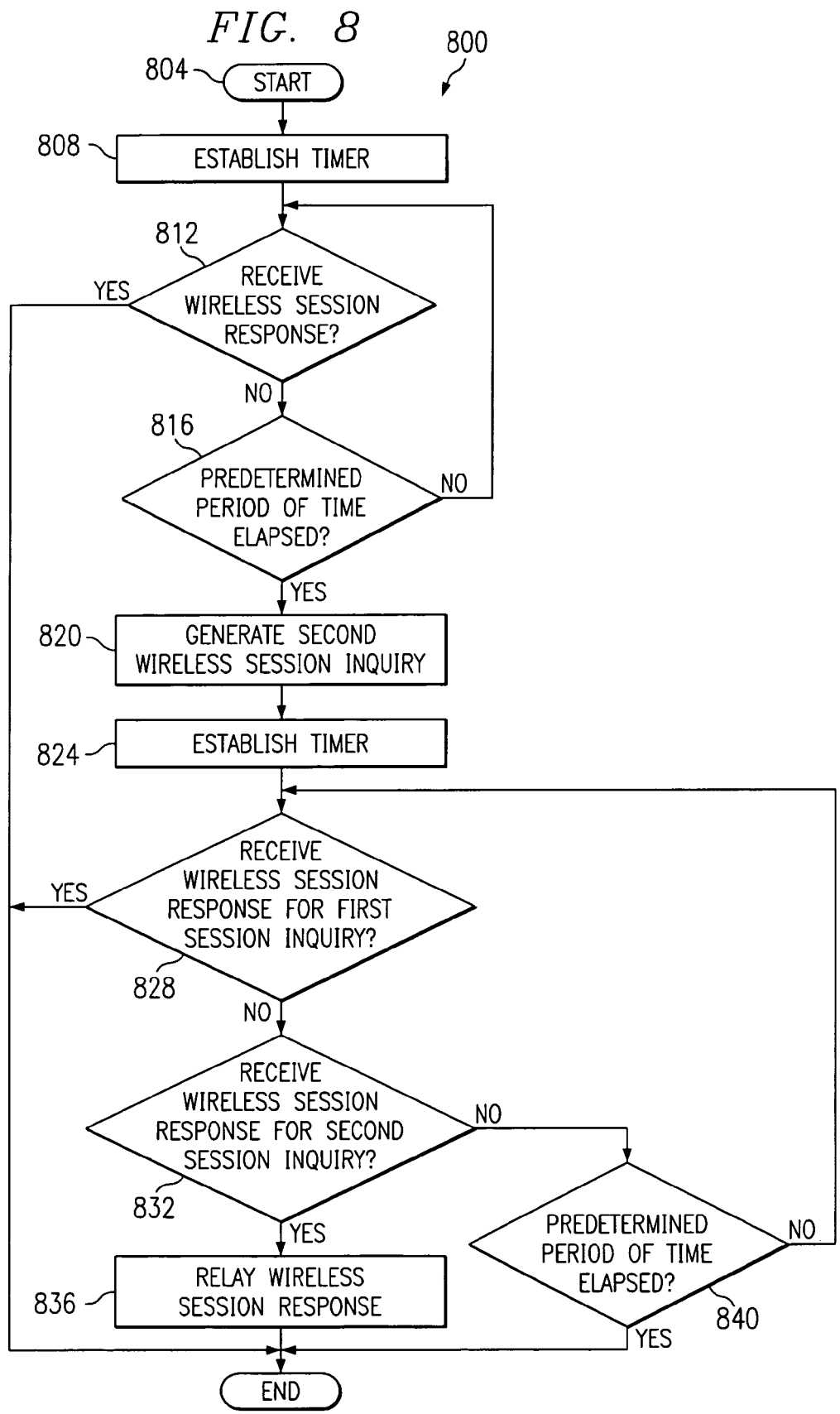

SYSTEM AND METHOD FOR SELECTING A WIRELESS SERVING NODE

TECHNICAL FIELD OF THE INVENTION

This invention relates generally to the field of wireless communications and, more particularly, to a method and system for selecting a wireless serving node.

BACKGROUND OF THE INVENTION

Modern communication systems allow individuals to stay in communication as they move about. The most notable device for this is the cellular telephone, which allows people to communicate verbally with each other. There is, however, a whole other range of communications that people use in their daily lives that are not as well developed for mobile use—the sending and receiving of data, such as, for example, over the Internet.

To address this need, modern communication systems include wireless devices that are capable of initiating data sessions through serving nodes that couple the devices to a network. The wireless devices may then receive data, such as, for example, stock quotes, advertisements, and/or e-mails, from various service providers.

In existing networks, when a wireless device moves from one location to another, a new wireless and/or data link may have to be established to service the device. While establishing a new wireless link may be accomplished quite readily, establishing a new data link may take significantly longer, which may result in a significant loss of data and/or annoyance to the user of the device.

Currently, there are two proposed solutions to this problem. One is to build serving nodes that can handle more data links, in an attempt to lower the probability that a wireless device will have to establish a data link to a different serving node. Another proposed solution is to have each serving node send information regarding the wireless sessions that it is managing to the other serving nodes. Accordingly, each serving node would know which serving node is managing a wireless session for the wireless device upon detecting a registration request from it.

SUMMARY OF THE INVENTION

The present invention substantially reduces and/or eliminates at least some of the problems with previous systems and methods. Accordingly, the present invention provides a method and system for efficiently selecting a wireless serving node.

In some embodiments, a method for selecting a wireless serving node includes receiving a wireless registration request at a wireless serving node and determining whether the serving node is managing a wireless session associated with the registration request. The method also includes generating a wireless session inquiry if the serving node is not managing a wireless session associated with the registration request, receiving a wireless session response containing a serving node identifier, and generating a wireless registration response containing the serving node identifier.

In particular embodiments, a system for selecting a wireless serving node includes a memory and a processor. The memory includes logical instructions and a table having information regarding wireless sessions being managed by a wireless serving node. The processor is coupled to the memory and, according to the instructions, is operable to receive a wireless registration request, to determine whether the serving node is managing a wireless session associated with the registration request, to generate a wireless session inquiry if the serving node is not managing a wireless session associated with the registration request, to receive a wireless session response containing a serving node identifier, and to generate a wireless registration response containing the serving node identifier.

In certain embodiments, a method for selecting a wireless serving node includes receiving a wireless session inquiry at a wireless serving node and determining whether the serving node is managing a wireless session associated with the session inquiry. The method also includes generating a wireless session response containing an identifier for the serving node if the serving node is managing a wireless session associated with the session inquiry.

The present invention contains several technical features. For example, in certain embodiments, the present invention allows a wireless serving node that receives a wireless registration request for a mobile unit to attempt to determine whether it or any associated wireless serving nodes is currently servicing the mobile unit. If the target serving node makes such a determination, the existing data link from the already servicing serving node may be maintained. Accordingly, a new data link does not have to be established to the mobile unit for a hard handoff, which will decrease the time in which data cannot be transmitted. As an additional example, in some embodiments, the invention does not have a direct adverse impact on wireless serving node operations of the rate of data link originations and terminations. As another example, in certain embodiments, the target serving node does not have to store data about the communication sessions being handled by its associated serving nodes. Thus, the memory and processing resources of the target serving node may be conserved. Furthermore, because the target serving node does not have to keep track of the sessions being managed by other serving nodes, signaling between the serving nodes may be reduced. As a further examples in some embodiments, the present invention allows wireless serving nodes to be grouped together while allowing communication between groups. Thus, the search for a serving node already servicing a mobile unit may span one or more groups, potentially providing nationwide, or even global, search and data link capabilities. Moreover, in certain embodiments, the size of groups may be readily increased or decreased.

Other technical features will be readily apparent to those skilled in the art from the following figures, description, and claims. Of course, certain embodiments may possess none, one, some, or all of these technical features.

BRIEF DESCRIPTION OF THE DRAWINGS

The drawings described below provide a better understanding of the present invention, especially when considered with the following written description, and of its technical features:

FIG. 2 is a block diagram illustrating one embodiment of a serving node for the communication system of FIG. 1;

FIG. 3 illustrates one embodiment of a table containing wireless session information for the serving node of FIG. 2;

FIG. 4 is a flowchart illustrating operations of a serving node in accordance with one embodiment of the present invention;

FIG. 5 is a flowchart illustrating operations of a packet control function in accordance with one embodiment of the present invention;

FIG. 6 is a flowchart illustrating further operations of a serving node in accordance with one embodiment of the present invention;

FIG. 7 is a block diagram illustrating a serving node architecture in accordance with one embodiment of the present invention; and FIG. 8 is a flowchart illustrating one embodiment of operations of a serving node in the architecture of FIG. 7.

DETAILED DESCRIPTION OF THE INVENTION

Figure 1:
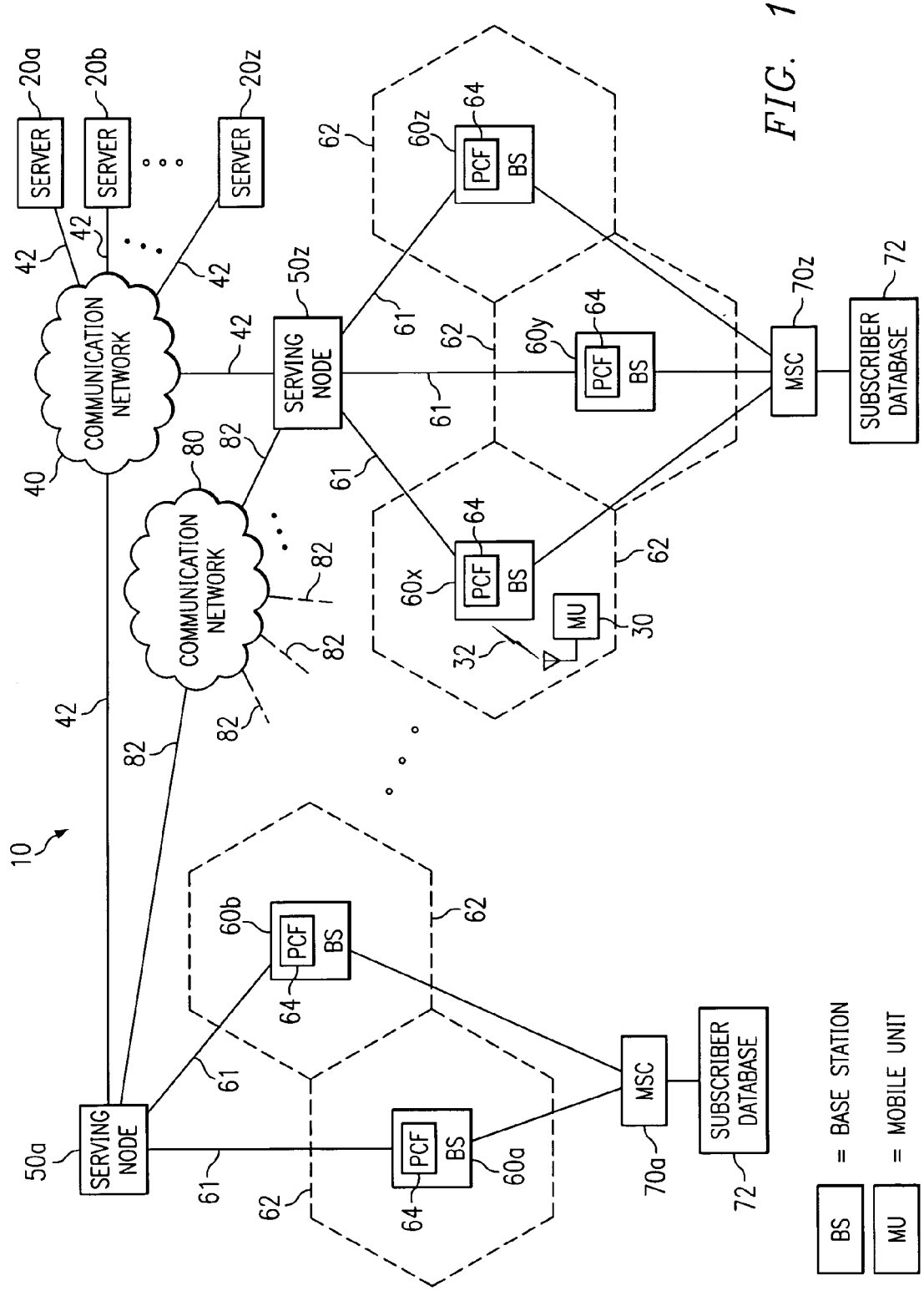
FIG. 1 is a block diagram illustrating a communication system in accordance with one embodiment of the present invention.

FIG. 1 is a block diagram illustrating a communication system 10 in accordance with one embodiment of the present invention. In general, system 10 includes servers 20 that desire to send data to and/or receive data from a mobile unit 30 and a communication network 40 for transferring the data between servers 20 and mobile unit 40. Servers 20 may store and/or generate the data to be sent to mobile unit 30 and may provide the data upon request, by using push techniques, or in any other appropriate manner. The data may include video, text, audio, voice, and/or any other type of data.

In more detail, servers 20 may be any type of devices that can send data to mobile unit 30 and/or assist in managing system 10. For example, servers 20 may include stock quote servers, weather forecast servers, e-mail servers, and/or any other appropriate type of data server. As another example, servers 20 may include an accounting server, a location server, and/or any other suitable server for providing services in communication system 10. In particular embodiments, one or more of servers 20 may receive data from mobile unit 30. In general, system 10 may have any number and/or type of servers.

To assist one or more of servers 20 in sending data to mobile unit 30, system 10 includes a communication network 40. Communication network 40 is coupled to servers 20 by links 42 and is operable to receive data from servers 20 and send it towards mobile unit 30. In particular embodiments, network 40 is also able to receive data from mobile unit 30 and send it to one or more of servers 20. Communication network 40 may be composed of servers, routers, switches, repeaters, backbones, links, and/or any other appropriate type of communication devices. Links 42 of communication network 40 may be wires, fiber-optic cables, microwave channels, and/or any other appropriate type of wireline and/or wireless links. Links 42 may also connect to a plurality of intermediate servers, routers, switches, repeaters, backbones, and/or other communication devices between communication network 40 and servers 20 and mobile unit 30. In general, communication network 40 may be any interconnection found on any communication network, such as a wide area network (WAN), the Internet, or any other data exchange system created by coupling two or more computers together.

Communication system 10 also includes serving nodes 50, which are coupled to communication network 40 by links 42. In general, serving nodes 50 are operable to receive data destined for mobile units, such as mobile unit 30, from communication network 40 and send the data towards the mobile units. In particular embodiments, serving nodes 50 may also receive data from the mobile units and send it to communication network 40.

In certain embodiments, each of serving nodes 50 may include a home agent and/or a foreign agent for managing communications through them between mobile units and communication network 40. Home agents and foreign agents may provide communication between a mobile unit and an end point, such as, for example, another mobile unit, a telephone, one of servers 20, or any other suitable device. A home agent may include a binding table that stores data relating to a mobile unit, such as a mobile unit identifier, a care of address (COA) for the current foreign agent, the internet protocol (IP) address or addresses assigned to the mobile unit, other mobile binding information, and/or any other suitable tunneling characteristics. Similarly, a foreign agent may include a binding table that stores data relating to each corresponding mobile unit. For example, for each corresponding mobile unit, the binding table of the foreign agent may include a mobile unit identifier, an address for the home agent, the IP address or addresses assigned to the mobile unit, other binding mobile information, and any other tunneling characteristics. Serving nodes 50 may be packet data serving nodes.

Communication system 10 also includes base stations 60. Base stations 60 are coupled to serving nodes 50 by links 61 and are operable to receive data destined for mobile units from serving nodes 50 and wirelessly communicate the data to the mobile units. In certain embodiments, base stations 60 may also wirelessly receive data for servers 20 from mobile units and send the data towards servers 20. Links 61 may be radio packet (RP) data switch node links and/or any other suitable links. Each RP link provides a logical path for a mobile unit data packet session between one of base stations 60 and the serviced mobile unit. Base stations 60 are operable to provide wireless communication between multiple mobile units located within their service areas 62. It will be recognized that one or more of serving nodes 50 may be coupled to one or more of base stations 60 and that one or more of serving nodes 50 may be coupled to one or more of base stations 60. Base stations 60 include a packet control function (PCF) 64 to manage the sending and receiving of data to and/or from mobile units such as mobile unit 30. PCFs 64 may be logic encoded in media, microcontrollers, application-specific integrated circuits, and/or any other type of system for manipulating information in a logical manner.

Mobile unit 30 may be a wireless telephone, a wireless interface terminal, a wireless personal digital assistant, or any other suitable mobile device operable to provide wireless communication in communication system 10. Mobile unit 30 is operable to communicate with base stations 60 over a radio frequency (RF) link 32 or other suitable wireless link. Mobile unit 30 and serving nodes 50 may communicate data and associated information by in-band and/or out-of-band messaging.

According to one embodiment, link 32 is an RF link that is based on established technology, such as IS-95 CDMA, W-CDMA, or CDMA-2000. In a particular embodiment, link 32 is a code division multiple access (CDMA) link based on a CDMA standard in which packets are segmented into frames for wireless transmission from mobile unit 30 to base stations 60, where the frames are reassembled to reconstitute the packets.

Communication system 10 also includes mobile switching centers (MSCs) 70 coupled to base stations 60. MSCs 70 are operable to perform authentication and to set up and disconnect calls for mobile units serviced by base stations 60. MSC's 70 are also operable to provide, in conjunction with base stations 60, switch and soft hand-off functionality for system 10. In this way, data, such as voice, video, audio, text, and/or any other type of data may be sent to mobile unit 30 as it moves between areas 62 serviced by base stations 60. Accordingly, mobile unit 30 may travel throughout a wide geographic area, while maintaining wireless communications. Each MSC 70 includes a subscriber database 72. Subscriber databases 72 are operable to store service level agreements for mobile units and to provide the agreements to serving nodes 50 for service management, traffic management, or other appropriate operations. Subscriber databases 72 may also store information relating to mobile units and/or users of mobile units, such as names, addresses, account numbers, account types, and any other suitable information.

Communication system 10 additionally includes a communication network 80. As illustrated, communication network 80 is coupled to serving nodes 50 by links 82. Links 82 may be wires, fiber-optic cables, microwave channels, and/or any other suitable type of wireline or wireless link. Through links 82, communication network 80 allows serving nodes 50 to exchange data with each other. Communication network 80 may be composed of servers, routers, switches, bridges, repeaters, backbones, links, and/or any other suitable type of communication equipment. In general, communication network 80 may be any interconnection found on any communication network, such as a WAN, the Internet, or any other data exchange system created by coupling two or more computers together. In particular embodiments, all or a part of communication network 80 may be a part of communication network 40.

In particular embodiments of operation, when mobile unit 30 desires a data service, which may be triggered by the initiation of an application at the mobile unit, a wireless session is initiated between the mobile unit, one of base stations 60, and one of serving nodes 50. As illustrated in FIG. 1, the wireless session would be between mobile unit 30, base station 60x, and serving node 50z. Initiating a wireless session may involve allocating RF resources between mobile unit 30 and base station 60x, establishing an RP session between base station 60x and serving node 50z, establishing a data link between mobile unit 30 and serving node 50z, and/or allocating an IP address to mobile unit 30.

Establishing a data link may involve PCF 64 of base station 60x forming a wireless registration request for mobile unit 30 and sending the request to serving node 50z. The registration request may include an identifier for mobile unit 30, an identifier for a user of the mobile unit, an identifier for base station 60x, an indication of the data service requested, and/or any other appropriate data. In particular embodiments, the registration request may be an A11-Registration Request, although any other appropriate type of registration request may be used. In certain embodiments, base stations 60 may choose between the serving nodes 50 to which they are coupled as to where to send the registration request.

When the target serving node, serving node 50z in the illustration, receives the registration request, it decides whether it is already managing a wireless session for the mobile unit and, if not, whether it will attempt to establish a wireless session with the mobile unit. In particular embodiments, the target serving node may also attempt to authenticate mobile unit 30. If the serving node decides to attempt to establish a wireless session, the serving node generates a registration response indicating acceptance of the request and sends it to PCF 64 of base station 60x. In particular embodiments, the registration response may be an A11-Registration Reply, although any other appropriate type of registration response may be used. The data link may then be established, which may include negotiation, verification, privilege determination, and/or profile determination. The data link may be a serial link and, in particular embodiments, may be a point-to-point protocol (PPP) link between the serving node and the mobile unit.

Assuming mobile unit 30 has a data link to serving node 50z through the base station 60x, when mobile unit 30 moves into area 62 of another one of base stations 60, one of serving nodes 50 recognizes that the mobile unit is communicating with one of its associated base stations 60 by receiving a registration request from packet control function 64 of the base station serving that area. For example, if mobile unit 30 moves into area 62 of base station 60y, PCF 64 of base station 60y detects the presence of mobile unit 30. Upon detecting the presence of the mobile unit, the detecting PCF 64 determines a serving node that may be able to service the mobile unit. In particular embodiments, the target serving node can be determined by examining an identifier of the mobile unit, such as for example an International Mobile Subscriber Identifier (IMSI). Upon determining a target serving node for the mobile unit, the detecting PCF 64 generates a wireless registration request for mobile unit 30 and sends this request to the targeted one of serving nodes 50. The registration request may include an identifier for the mobile unit, an identifier for the base station, an indication of the type of data service desired, and/or any other appropriate type of wireless data. In particular embodiments, the wireless registration request may be an A11-Registration Request, although any other appropriate type of wireless registration request may be use. Upon receiving the wireless registration request, the target serving node 50 determines whether the registration request is associated with an active wireless session. The target serving node 50 may make this determination in particular embodiments by examining a mobility event indication (MEI) in the request. Note that if the registration request indicates that there is no wireless session associated with the registration request, the target serving node 50 may initiate a wireless session with the mobile unit.

Upon determining that the registration request is associated with an active wireless session, the target serving node 50 determines whether it is managing a wireless session associated with the registration request. The target serving node may accomplish this, for example, by examining a table containing data regarding the wireless sessions that it is currently managing. If the target serving node determines that it is managing a wireless session associated with the registration request, which could happen if mobile unit 30 moves from area 62 of base station 60x to area 62 of base station 60y, for example, the target serving node generates a registration response indicating acceptance of the request. This request is sent to the detecting PCF 64, which generates a message regarding the wireless session for mobile unit 30. Accordingly, the data link may be maintained between the already servicing serving node 50 and the mobile unit 30.

If, however, the target serving node 50 determines that it is not managing a wireless session associated with the registration request, which could occur if mobile unit 30 moved to area 62 of base station 60b, for example, the target serving node generates a wireless session inquiry for the other serving nodes with which it is associated. Serving nodes may be associated with each other by geography, type, network type, operator, and/or any other appropriate parameter. Note that serving nodes are not necessarily associated because they can communicate through communication network 80. The wireless session inquiry may contain any type of data by which serving nodes 50 may determine whether or not they are managing a wireless session for mobile unit 30. In particular embodiments, the wireless session inquiry may contain the IMSI for mobile unit 30. In other embodiments, it may also contain an Access Network Identifier (ANID). The target serving node 50 then sends the session inquiry over one of links 82 to communication network 80, which distributes it to the appropriate ones of serving nodes 50. The wireless session inquiry can be targeted at specific ones of serving nodes 50 or broadcast in general. In particular embodiments, the wireless session inquiry is a multicast message targeted at serving nodes 50 that are in a particular group. Accordingly, each serving node 50 subscribes to a multicast channel dedicated to the associated group or groups. Note that the target serving node 50 may or may not know how many serving nodes 50 are in the group.

After transmitting the wireless session inquiry, the target serving node waits to receive a wireless session response from one of the serving nodes 50. In particular embodiments, if the target serving node 50 does not receive a response to the wireless session inquiry within a predetermined amount of time, such as, for example, ten seconds, the target serving node 50 may initiate a wireless session with the mobile unit 30. The wireless session response may contain any type of identifier by which one of serving nodes 50 may be identified by mobile 30 and/or detecting PCF 64. In particular embodiments, the response may contain a MAC address for the responding serving node 50, although other addresses, such as an Internet protocol (IP), address could be used. Upon receiving such a response, the target serving node 50 generates a registration response containing the identifier in the wireless session response and forwards this to the detecting PCF 64. The registration response may be any message that directs detecting PCF 64 to the currently servicing serving node. In particular embodiments, the registration response is an A11-Registration Reply indicating that the registration request is denied, possibly by indicating that the address for the serving node is unknown, and including the address for the serving node that generated the session response in the Home Agent information element. The detecting PCF 64 may then generate a new registration request based on this address. When the serving node 50 that is managing the wireless session receives the wireless session request, serving node 50z in the example in FIG. 1, it may update the data link information for the wireless session and continue managing the wireless session.

The illustrated embodiment of the present invention has several technical features. For example, a serving node that receives a wireless registration request for a mobile unit attempts to determine whether it or any of its associated serving nodes is currently servicing the mobile unit. If the target serving node makes such a determination, the existing data link from the serving node may be maintained. Accordingly, a new data link does not have to be established to the mobile unit, which will decrease the time in which data cannot be transmitted. Additionally, because the target serving node does not have to store data about the communication sessions being handled by all of the other serving nodes, the memory and processing resources of the target serving node may be conserved. Furthermore, because the target serving node does not have to keep track of the sessions being managed by its associated serving nodes, signaling between the serving nodes may be reduced.

FIG. 2 is a block diagram illustrating one embodiment of serving node 50z for communication system 10. In this embodiment, serving node 50z includes a processor 52, a memory 54, and communication interfaces 58. Memory 54, which is coupled to processor 52, includes a set of logic 55 for processor 52 and a table containing information regarding wireless sessions that serving node 50z is managing. Communication interfaces 58 are coupled to memory 54 and processor 52 and allow the serving node to communicate with communication network 40, communication network 80, and one or more of base stations 60.

In operation, processor 52, according to logic 55, sends received data for mobile unit 30 to the appropriate one of base stations 60. Additionally, processor 52 manages wireless sessions with mobile units. For example, serving node 50z may establish a wireless session with mobile unit 30 upon detecting an appropriate registration request. As a further example, when serving 50z receives a registration request from PCF 64 of one of base stations 60, processor 52 determines whether the registration request is associated with an active wireless session. If it is not, processor 52 may initiate a wireless session with the requesting mobile unit. If, however, the wireless registration request is associated with an active wireless session, processor 52 determines whether it is managing a wireless session associated with the registration request. To accomplish this, processor 52 may examine the information stored in session table 56.

FIG. 3 illustrates one embodiment of session table 56 for serving node 50z. As illustrated, session table 56 includes columns 92, 94, 96, and 98. Column 92 includes a local identifier for each wireless session being managed by serving node 50Z. Column 94 includes the mobile unit identifier associated with the session identifier in column 92. The identifier in column 94 may be an electronic serial number (ESN), a mobile identification number (MIN), an IMSI, or any other appropriate identifier for a mobile unit. Column 96 includes the address of the serving node to which the mobile unit is anchored, and column 98 includes time information about the session, such as, for example, when the wireless session was established, how much time has elapsed since the wireless was established, and/or any other appropriate timing parameters of the wireless session.

Although FIG. 3 illustrates one embodiment of session table 56, other embodiments may have less, more, and/or a different arrangement of information. For example, in some embodiments, session table 56 may not include a session identifier. As another example, in certain embodiments, session table 56 may include service and/or traffic management parameters for mobile units. As a further example, in particular embodiments, session table 56 may include session status indicators for each session.

If processor 52 determines that it is managing a wireless session associated with the registration request, processor 52 generates a registration response indicating acceptance of the wireless registration request. If, however, processor 52 determines that it is not managing a wireless session associated with the registration request, processor 52 generates a wireless session inquiry for its associated serving nodes, such as, for example, serving node 50a. Processor 52 then waits to receive a wireless session response from one of its associated serving nodes, and, upon receiving such a response, generates a registration response containing the identifier of the associated serving node in the session response.

The components of serving node 50z may have a variety of forms and/or arrangements. For example, processor 52 may be a microprocessor, a microcontroller, a field-programmable gate array, a biological computer, an atomic computer, and/or any other type of device for manipulating data in a logical manner. As another example, memory 54 may be random access memory (RAM), read-only memory (ROM), compact disk read-only memory (CD-ROM), and/ or any other type of volatile or non-volatile electromagnetic or optical data storage device. In particular embodiments, all or a part of memory 54 may be encoded on processor 52. As a further example, communication interfaces 58 may be network interface cards, transceivers, ports, modems, and/or any other type of device for sending data to and receiving data from a communication network.

FIG. 4 is a flowchart 400 illustrating operations of a serving node, such as, for example, serving node 50z, in accordance with one embodiment of the present invention. At start block 404, the serving node may or may not have wireless sessions established with mobile units. At decision block 408, the serving node determines whether it has received a wireless registration request. The wireless registration request may have been generated by a packet control function and/or a mobile unit and may include an identifier for a mobile unit. In particular embodiments, the wireless registration request is an A11-Registration Request. If the serving node has not received a wireless registration request, the serving node continues to wait to receive such a request. Upon receiving a registration request, making the serving node a "target serving node", the serving node determines whether the registration request is associated with an active wireless session at decision block 412. For example, the serving node may examine an MEI in the registration request to determine whether the registration request is associated with an active wireless session.

If the registration request is not associated with an active wireless session, the serving node determines whether it has sufficient resources available to manage the registration request at decision block 416. Such a determination may involve the number of sessions already being serviced by the serving node, the bandwidth required by each of the sessions being managed by the serving node and by the service request, and/or any other appropriate criteria. If the serving node determines that it does not have sufficient resources available to manage a wireless session for the registration request, the serving node generates a registration response indicating denial of the registration request at function block 420. This registration response may then be sent to the packet control function and/or mobile unit that generated the registration request. The registration process is then at an end for the serving node. If, however, the serving node determines that it has sufficient resources available to manage the wireless session, the serving node updates its wireless session information, such as the information shown in session table 56 in FIG. 3, at function block 424 and generates a registration response indicating acceptance of the registration request at function block 428. The registration response may then be sent to the packet control function and/or mobile unit that generated the registration request. The registration process is then at an end.

Returning to decision block 412, if the serving node determines that the registration request is not associated with an active wireless session, the serving node determines whether it is managing a wireless session associated with the registration request at decision block 432. To accomplish this, the serving node may, for example, examine a table containing information about wireless sessions that it is currently managing, such as, for example, session table 56 in FIG. 3. If the serving node determines that it is managing a wireless session associated with the registration request, the serving node updates wireless session information at function block 424 and generates a registration response indicating acceptance of the registration request at function block 428. The registration response may then be sent to the packet control function and/or mobile unit that generated the registration request, and the registration process is at an end. If, however, the serving node determines that it is not managing a wireless session associated with the registration request, the serving node generates a wireless session inquiry at function block 436. As mentioned previously, the wireless session inquiry is used to query associated serving nodes as to whether they are managing a wireless session associated with the service request. The session inquiry may or may not be the same as the registration request. The wireless session inquiry may then be sent to the associated serving nodes. In particular embodiments, the session inquiry is sent as a multicast message.

The serving node establishes a timer for the session inquiry at function block 440 and determines whether it has received a wireless session response to the wireless inquiry at decision block 444. Such a response may indicate that an associated serving node is managing a wireless session associated with the service request and may include an identifier, such as an address, for that serving node. If the serving node has received a session response, the serving node generates a registration response containing the identifier for the responding serving node at function block 448. The registration response may indicate acceptance of, denial of, or be ambivalent about the registration request. The registration response may then be sent to the packet control function and/or mobile unit that generated the registration request.

Returning to decision block 444, if the serving node has not received a wireless session response, the serving node determines whether a predetermined period of time has elapsed at decision block 452. If a predetermined period of time has not elapsed, the serving node again checks whether a wireless session response has been received at decision block 444. If, however, a predetermined period of time elapses before a session response is received, the serving node initiates a wireless session for the registration request beginning at decision block 416. The absence of a session response probably indicates that no serving node that is associated with the serving node is managing a wireless session for the service request.

Although flowchart 400 illustrates a variety of operations for a serving node in accordance with one embodiment of the present invention, other embodiments of the invention may have fewer, more, and/or a different arrangement of operations for a serving node. For example, a serving node may not attempt to initiate a wireless session if the registration request is not associated with an active wireless session. As another example, a serving node may have to exchange further information with the packet control function and/or mobile unit to initiate and/or update a wireless session, such as, for example, establishing or updating a data link. As a further example, a serving node may not use a timer for a session inquiry. As still another example, a PCF and/or a mobile unit may try to register again with the serving node after receiving a denial.

FIG. 5 is a flowchart illustrating the operations of a packet control function, such as, for example, packet control function 64 of serving node 60x, in accordance with one embodiment of the present invention. The operations begin at start block 504, where the packet control function may or may not already be handling packets for other mobile units. At decision block 508, the packet control function determines whether it detects a new mobile unit. The packet control function may detect a new mobile unit by, for example, receiving a signal from its base station. If the packet control function detects a new mobile unit, the packet control function determines a target serving node for the mobile unit at function block 512. In certain embodiments, the packet control function may examine the identifier for the mobile unit, such as, for example, the IMSI, to determine a target serving node for the mobile unit. At decision block 516, the packet control function generates a wireless registration request for the target serving node. As one example, a registration request may be an A11-Registration Request. The registration request may then be sent to the target serving node. At decision block 520, the packet control function waits to receive a wireless registration response.

Upon receiving the wireless registration response, the packet control function determines whether the request was accepted at decision block 524. If the request was accepted, the packet control function generates a message regarding the wireless session for the mobile unit at decision block 528. The message may be then transmitted to the mobile unit and the registration process is at an end for the packet control function. If, however, the registration request was not accepted, the packet control function determines whether the registration response contains a serving node identifier at decision block 532. If the registration response contains a serving node identifier, the packet control function returns to decision block 516, where it generates a registration request using the serving node identifier from the registration response. If, however, the registration response does not contain a serving node identifier, the packet control function generates a message indicating that the service request has been denied for the mobile unit at function block 536. This message may then be transmitted to the mobile unit and the registration process is at an end. Note that the registration process may be reinitiated at a later time.

Although flowchart 500 illustrates a variety of operations for a packet control function in accordance with one embodiment of the present invention, other embodiments of the present invention may have fewer, more, and/or a different arrangement of operations for a packet control function. For example, the packet control function may not determine a target serving node for the mobile unit, especially if the packet control function is only anchored to one serving node. As another example, the packet control function may not have to receive a denial of a registration request to initiate another wireless registration request based on a received serving node identifier. As an additional example, a packet control function may not have to generate a message indicating that service is denied. As a further example, a packet control function may have a variety of other operations to perform in initiating a wireless session between a mobile unit a serving node. As still a further example, a packet control function may implement a timer for the wireless registration request. If the timer expires, the packet control function may, for example, generate a message indicating that service is denied, reinitiate the wireless registration request, or perform any other appropriate operations.

FIG. 6 is a flowchart 600 illustrating further operations of a serving node, such as, for example, serving node 60x, in accordance with the one embodiment of the present invention. The operations begin at start block 604, where the serving node may or may not have wireless sessions established with mobile units. At decision block 608, the serving node waits to receive a wireless session inquiry. Such an inquiry may have been generated by a target serving node associated with the serving node. Upon receiving a wireless session inquiry, the serving node determines whether it is managing a wireless session associated with the session inquiry. The serving node may, for example, make this determination based on the information in a table regarding wireless sessions that it is managing. If the serving node is not managing a wireless session associated with the session inquiry, the serving node again waits to receive a wireless session inquiry at decision block 608. If, however, the serving node is managing a wireless session associated with the session inquiry, the serving node determines whether it is associated with the network of the target serving node at decision block 616. Serving nodes may not be associated, for example, if they belong to different operators, are geographically remote, implement different data protocols, and/or operate at different speeds. Such an analysis may, for example, be performed by examining an identifier in the session inquiry, such as, for example, an ANID. If the mobile unit is not associated with the network of the target serving node, the serving node returns to waiting for a wireless session inquiry.

If, however, the serving node is associated with the network of the target serving node, the serving node generates a wireless session response containing an identifier for the serving node at function block 620. The identifier could be a MAC address, an IP address, or any other appropriate identifier. The session response may then be sent to the target serving node as a directed or multicast message. The serving node then waits to receive a wireless registration request associated with the session response at decision block 624. This registration request may have been generated by a packet control function that received the identifier of the serving node from the target serving node. Upon receiving the registration request associated with the session response, the serving node updates its wireless session information, such as, for example, in a wireless session information table, at function block 628 and generates a wireless registration response indicating acceptance of the registration request at function block 632. The wireless registration response may then be sent to the packet control function that sent the registration request.

Although flowchart 600 illustrates a variety of operations for a serving node in accordance with one embodiment of the present invention, other embodiments may include fewer, more, and/or a different arrangement of operations. For example, a serving node may not determine whether it is associated with the network of the target serving node. This may occur, for instance, if multicast message groups are only established between interoperable serving nodes. As another example, a serving node may not wait to receive a wireless registration request associated with the session response. As a further example, a serving node may have a variety of other operations it needs to perform upon receiving a registration request.

FIG. 7 is a block diagram illustrating a serving node architecture 700 in accordance with one embodiment of the present invention. As illustrated, architecture 700 includes serving nodes 750, which are divided into groups 702, 704, and 706. Note that two of the serving nodes, serving node 750d and serving 750g, specifically, are in two of the groups. Accordingly, if one of serving nodes 750d, 750g receives a wireless session inquiry, it may also, upon certain conditions, send the wireless session inquiry to a different group of serving nodes. As used herein, two groups of serving nodes are different if one group contains at least one serving node that the other group does not contain.

For example, assume that mobile unit 30 establishes wireless service with serving node 750a. Accordingly, as previously discussed, as mobile unit 30 moves between serving nodes 750 in group 702, the data link between mobile unit 30 and serving node 750a may be maintained. However, when mobile unit 30 moves out of range of these serving nodes, into the vicinity of serving node 750e for example, the wireless inquiry generated by serving node 750e will only be received by the serving nodes in group 704. Accordingly, the data link to serving node 750a would be broken and a new data link would have to be established with serving node 750e if serving node 750a could not be contacted. However, if serving node 750d can relay the session inquiry or formulate a second wireless session inquiry based on the session inquiry for the serving nodes in group 702, the data link may be maintained because serving node 750a may be made known to the serving node 750e.

The data link may be maintained even when mobile unit 30 moves into the vicinity of serving node 750i, for example, if serving node 750g can relay the wireless session inquiry or formulate another wireless session inquiry based on the one received from serving node 750i and serving node 750d can relay the wireless session inquiry or formulate another wireless session inquiry based on the one received from serving node 750g.

Accordingly, mobile unit 30 may be able to range between different groupings of serving nodes and still maintain its data link to serving node 750a. In principle, mobile unit 30 could maintain its data link through any number of groups of serving nodes.

Architecture 700 is thought to be especially useful where it may be tailored to geographic usage of mobile units. For example, group 704 may represent a downtown area of a city, group 702 may represent a major thoroughfare away from downtown, and group 706 may represent another major thoroughfare away from downtown. Accordingly, a mobile unit may move rapidly throughout heavily serviced areas of the city and maintain its data link to a particular serving node. Moreover, not every wireless serving node in the communication has to be made aware of hard handoffs for a mobile unit, as these may be handled by the serving nodes within a group. Thereby, hard handoff messaging may typically be reduced to a subset of serving nodes while maintaining mobility coverage over a large geographical area by inter-group messaging through the overlapping serving nodes.

FIG. 8 is a flowchart 800 illustrating one embodiment of operations for an overlapping serving node in architecture 700. The operations in flowchart 800 are useful in finding a serving node in a different group from the target serving node. At start block 804, the serving node has received a wireless session inquiry from a target serving node and decided that it is not managing a wireless session associated with the session inquiry. Accordingly, the operations in FIG. 8 may be in addition to those in flowchart 600, and can logically be incorporated into the negative path from decision block 612. The serving node establishes a timer for the wireless session inquiry at function block 808. At decision block 812, the serving node determines whether it has received a wireless session response associated with the wireless session inquiry. Such a session response may be generated and sent by a serving node that is managing a wireless session for the mobile unit associated with the session inquiry or by the target serving node. If the serving node has received such a wireless session response, the operations are at an end. If, however, the serving node has not received such a wireless session response, the serving node determines whether a predetermined period of time has elapsed at decision block 816. The appropriate period of time will probably depend on the exact structure of architecture 700, but may be between approximately one-half second and two seconds. If the predetermined period of time has not elapsed, the serving node returns to check whether a session response has been received at decision block 812.

If, however, the predetermined period of time has elapsed, the serving node generates a second wireless session inquiry at decision block 820. Note that the second wireless session inquiry may be a repeat of the original wireless session inquiry or a wireless session inquiry based on the original. At function block 824, the serving node establishes a timer for the second wireless session inquiry. The second wireless session inquiry may be sent to a different group of serving nodes than the group to which the original session inquiry was sent. At decision block 828, the serving node determines whether it has received a wireless session response for the first wireless session inquiry. If the serving node has received such a session response, the operations are at an end, for it is no longer necessary to search for a serving node that is managing a wireless session for the mobile unit. If, however, the serving node has not received a wireless session response for the first session inquiry, the serving node determines whether it has received a wireless session response for the second session inquiry at decision block 832. If the serving node has received such a session response, the serving node forwards the session response to the target serving node at function block 836. The session response may be sent as a directed or multicast message. The operations are then at an end. If, however, the serving node has not received a wireless session response for the second session inquiry, the serving node determines whether a predetermined period of time has elapsed at decision block 840. While the period of time will probably depend on the architecture of the serving nodes, it may be between approximately one-half second and two seconds. If the predetermined period of time has not elapsed, the serving node returns to decision block 828. If, however, the predetermined period of time has elapsed, the operations are at an end.

Although flowchart 800 illustrates a variety of operations for a serving node in accordance with one embodiment of the present invention, serving nodes in other embodiments may include fewer, greater, and/or a different arrangement of operations. For example, a serving node may not determine whether a predetermined period of time has elapsed for the second wireless session inquiry. As another example, the timer may be established before the generation of the second wireless session inquiry. As a further example, the serving node may determine whether a session response associated with the first session inquiry has been received.

In particular embodiments, the serving nodes in a group can be associated with a list of network identifiers, such as, for example, ANIDs. Network identifiers may be added to or removed from the list as wireless network topology changes. This list can allow a serving node that belongs to a few groups to properly redirect a registration request that it cannot accept to another serving node.

Although the present invention has been described with several embodiments, various changes and modifications will be readily suggested to those skilled in the art. It is intended that the appended claims encompass such changes and modifications.

What is claimed is:

1. A method for selecting a wireless serving node, comprising:
   receiving a wireless registration request at a wireless serving node;
   determining whether the serving node is managing a wireless session associated with the registration request;

generating a wireless session inquiry for a group of associated wireless serving nodes if the serving node is not managing a wireless session associated with the registration request;

receiving a wireless session response containing a serving node identifier;

generating a wireless registration response containing the serving node identifier;

determining the time elapsed since generating the wireless session inquiry; and initiating the establishment of a wireless session if a predetermined amount of time has elapsed determining whether the registration request is associated with an active wireless session; and initiating the establishment of a wireless session if the registration request is not associated with an active wireless session.

2. The method of claim 1, wherein determining whether the registration request is associated with an active wireless session comprises examining a Mobility Event Indication in the registration request.

3. The method of claim 1, further comprising generating a wireless registration response indicating acceptance of the registration request if the serving node is managing a wireless session associated with the registration request.

4. The method of claim 1, wherein the wireless registration request comprises an A11-Registration Request.

5. The method of claim 1, wherein determining whether the serving node is managing a wireless session associated with the registration request comprises searching a table containing information regarding wireless sessions being managed by the serving node.

6. The method of claim 1, wherein at least one of the wireless session inquiry and the wireless session response comprise a multicast message.

7. The method of claim 1, wherein the wireless session inquiry comprises an International Mobile Subscriber Identifier and an Access Network Identifier.

8. The method of claim 1, wherein the registration response containing the serving node identifier comprises a wireless registration response indicating denial of the registration request.

9. A system for selecting a wireless serving node, comprising:

means for receiving a wireless registration request at a wireless serving node;

means for determining whether the serving node is managing a wireless session associated with the registration request;

means for generating a wireless session inquiry for a group of associated wireless serving nodes if the serving node is not managing a wireless session associated with the registration request;

means for receiving a wireless session response containing a serving node identifier;

means for generating a wireless registration response containing the serving node identifier;

means for determining the time elapsed since generating the wireless session inquiry; and means for initiating the establishment of a wireless session if a predetermined amount of time has elapsed means for determining whether the registration request is associated with an active wireless session; and means for initiating the establishment of a wireless session if the registration request is not associated with an active wireless session.

10. The system of claim 9, wherein determining whether the registration request is associated with an active wireless session comprises examining a Mobile Event Identifier in the registration request.

11. The system of claim 9, further comprising means for generating a wireless registration response indicating acceptance of the registration request if the serving node is managing a wireless session associated with the registration request.

12. The system of claim 9, wherein the wireless registration request comprises an A11-Registration Request.

13. The system of claim 9, further comprising means for storing information regarding wireless sessions being managed by the serving node, wherein determining whether the serving node is managing a wireless session associated with the registration request comprises searching the means.

14. The system of claim 9, wherein at least one of the wireless session inquiry and the wireless session response comprise a multicast message.

15. The system of claim 9, wherein the wireless session inquiry comprises an International Mobile Subscriber Identifier and an Access Network Identifier.

16. The system of claim 9, wherein the registration response containing the serving node identifier comprises a wireless registration response indicating denial of the registration request.

17. A set of logic for selecting a wireless serving node, the logic encoded in media and operable to:

receive a wireless registration request at a wireless serving node;

determine whether the serving node is managing a wireless session associated with the registration request;

generate a wireless session inquiry for a group of associated wireless serving nodes if the serving node is not managing a wireless session associated with the registration request;

receive a wireless session response containing a serving node identifier;

generate a wireless registration response containing the serving node identifier;

determine the time elapsed since generating the wireless session inquiry; and initiate the establishment of a wireless session if a predetermined amount of time has elapsed determining whether the registration request is associated with an active wireless session; and initiating the establishment of a wireless session if the registration request is not associated with an active wireless session.

18. The logic of claim 17, wherein determining whether the registration request is associated with an active wireless session comprises examining a Mobile Event Identifier in the registration request.

19. The logic of claim 17, wherein the logic is further operable to generate a wireless registration response indicating acceptance of the registration request if the serving node is managing a wireless session associated with the registration request.

20. The logic of claim 17, wherein the wireless registration request comprises an A11-Registration Request.

21. The logic of claim 17, wherein determining whether the serving node is managing a wireless session associated with the registration request comprises searching a table containing information regarding wireless sessions being managed by the serving node.

22. The logic of claim 17, wherein at least one of the wireless session inquiry and the wireless session response comprise a multicast message.

23. The logic of claim 17, wherein the wireless session inquiry comprises an International Mobile Subscriber Identifier and an Access Network Identifier.

24. The logic of claim 17, wherein the wireless registration response containing the serving node identifier comprises a wireless registration response indicating denial of the registration request.

25. A method for selecting a wireless serving node, comprising:
receiving, at a wireless serving node, a wireless session inquiry from an associated wireless serving node;
determining whether the serving node is managing a wireless session associated with the session inquiry;
generating a wireless session response containing an identifier for the serving node if the serving node is managing a wireless session associated with the session inquiry;
determining whether the serving node is associated with a network from which the session inquiry originated; and
generating a wireless session response containing an identifier for the serving node only if the serving node is associated with the network from which the session inquiry originated determining the time elapsed since receiving the wireless session inquiry; and generating a second wireless session inquiry if a predetermined amount of time has elapsed, the second wireless inquiry directed to a different group of serving nodes than the first wireless session inquiry.

26. The method of claim 25, further comprising:
receiving a wireless registration request associated with the session response; and
generating a wireless registration response indicating acceptance of the registration request.

27. The method of claim 26, wherein the registration request comprises an A11-Registration Request.

28. The method of claim 25, wherein determining whether the serving node is associated with a network from which the session inquiry originated comprises examining a network identifier in the inquiry.

29. The method of claim 28, wherein the network identifier comprises an Access Network Identifier.

30. The method of claim 25, wherein at least one of the session inquiry and the session response comprise a multicast message.

31. The method of claim 25, wherein determining whether the serving node is managing a wireless session associated with the session inquiry comprises searching a table containing information regarding wireless sessions being managed by the serving node.

32. The method of claim 25, further comprising:
determining whether a wireless session response associated with the second session inquiry has been received; and
relaying the session response to the group of serving nodes from which the first session inquiry originated if the session response has been received.

33. A set of logic for selecting a serving node, the logic encoded in media and operable to:
receive a wireless session inquiry at a wireless serving node;
determine whether the serving node is managing a wireless session associated with the session inquiry;
generate a wireless session response containing an identifier for the serving node if the serving node is managing a wireless session associated with the session inquiry;
determine whether the serving node is associated with a network from which the session inquiry originated; and
generate a wireless session response containing an identifier for the serving node only if the serving node is associated with the network from which the session inquiry originated determining the time elapsed since receiving the wireless session inquiry; and generating a second wireless session inquiry if a predetermined amount of time has elapsed, the second wireless inquiry directed to a different group of serving nodes than the first wireless session inquiry.

34. The logic of claim 33, wherein the logic is further operable to:
receive a wireless registration request associated with the session response; and
generate a wireless registration response indicating acceptance of the registration request.

35. The logic of claim 34, wherein the registration request comprises an A11-Registration Request.

36. The logic of claim 33, wherein determining whether the serving node is associated with a network from which the session inquiry originated comprises examining a network identifier in the inquiry.

37. The logic of claim 36, wherein the network identifier comprises an Access Network Identifier.

38. The logic of claim 33, wherein at least one of the session inquiry and the session response comprise a multicast message.

39. The logic of claim 33, wherein determining whether the serving node is managing a wireless session associated with the session inquiry comprises searching a table containing information regarding wireless sessions being managed by the serving node.

40. The logic of claim 33, wherein the logic is further operable to:
determine whether a wireless session response associated with the second session inquiry has been received; and
relay the session response to the group of serving nodes from which the first session inquiry originated if the session response has been received.

41. A method for selecting a wireless serving node, comprising:
detecting the presence of a mobile unit at a wireless packet control function;
determining an identifier for a wireless serving node that could potentially service the mobile unit;
generating a wireless registration request containing the identifier;
receiving a wireless registration response;
determining whether the registration response indicates that the registration request is accepted;
determining whether the registration response contains a wireless serving node identifier if the registration response does not indicate that the registration request is accepted; and
generating, if the registration response does not indicate that the registration request is accepted and contains a wireless serving node identifier, a wireless registration request containing the identifier, wherein determining an identifier for a wireless serving node that could potentially service the mobile unit comprises analyzing an identifier of the mobile unit wherein it is determined whether the registration request is associated with an active wireless session; and the establishment of a wireless session is initiated if the registration request is not associated with an active wireless session.

42. The method of claim 41, wherein the wireless registration request comprises an A11-Registration Request.

43. The method of claim 41, further comprising generating a message regarding the wireless session if the registration request is accepted.

44. The method of claim 41, wherein the registration response containing the wireless serving node identifier indicates that the registration request is denied.

45. A set of logic for selecting a serving node, the logic encoded in media and operable to:
 detect the presence of a mobile unit;
 determine an identifier for a wireless serving node that could potentially service the mobile unit;
 generate a wireless registration request containing the identifier;
 receive a wireless registration response;
 determine whether the registration response indicates that the registration request is accepted;
 determine whether the registration response contains a wireless serving node identifier if the registration response does not indicate that the registration request is accepted; and
 generate, if the registration response does not indicate that the registration request is accepted and contains a wireless serving node identifier, a wireless registration request containing the identifier, wherein determining an identifier for a wireless serving node that could potentially service the mobile unit comprises analyzing an identifier of the mobile unit, wherein it is determined whether the registration request is associated with an active wireless session; and the establishment of a wireless session is initiated if the registration request is not associated with an active wireless session.

46. The logic of claim 45, wherein the wireless registration request comprises an A 11-Registration Request.

47. The logic of claim 45, wherein the logic is further operable to generate a message regarding the wireless session if the registration request is accepted.

48. The logic of claim 45, wherein the registration response containing the wireless serving node identifier indicates that the registration request is denied.

49. A method for selecting a wireless serving node, comprising:
 receiving an A11-Registration Request at a wireless serving node;
 examining a Mobile Event Identifier in the registration request to determine whether the registration request is associated with an active wireless session;
 initiating the establishment of a wireless session if the registration request is not associated with an active wireless session;
 searching a table containing information regarding wireless sessions being managed by the serving node to determine whether the serving node is managing a wireless session associated with the registration request if the registration request is associated with an active wireless session;
 generating an A11-Registration Reply indicating acceptance of the registration request if the serving node is managing a wireless session associated with the registration request;
 generating a multicast message containing a wireless session inquiry for a group of associated wireless serving nodes if the serving node is not managing a wireless session associated with the registration request, the wireless session inquiry including an International Mobile Subscriber Identifier and an Access Network Identifier;
 determining the time elapsed since generating the wireless session inquiry;
 initiating the establishment of a wireless session if a predetermined amount of time has elapsed;
 receiving a multicast message including a wireless session response containing a serving node identifier;
 generating an A11-Registration Reply indicating denial of the registration request and containing the serving node identifier;
 receiving a multicast message containing a wireless session inquiry from an associated wireless serving node;
 searching the table to determine whether the serving node is managing a wireless session associated with the session inquiry;
 determining whether the serving node is associated with the network from which the session inquiry originated if the serving node is managing a wireless session associated with the session inquiry; and
 generating a wireless session response containing an identifier for the serving node if the serving node is managing a wireless session associated with the session inquiry and if the serving node is associated with the network from which the session inquiry originated.

50. A method for selecting a wireless serving node, comprising:
 receiving, at a wireless serving node, a wireless session inquiry from an associated wireless serving node;
 determining whether the serving node is managing a wireless session associated with the session inquiry;
 generating a wireless session response containing an identifier for the serving node if the serving node is managing a wireless session associated with the session inquiry;
 receiving a wireless registration request associated with the session response; and
 generating a wireless registration response indicating acceptance of the registration request, wherein an identifier of a mobile unit is analyzed in order to determine the identifier for the serving node that could potentially service the mobile unit, wherein it is determined whether the registration request is associated with an active wireless session; and the establishment of a wireless session is initiated if the registration request is not associated with an active wireless session.

51. A method for selecting a wireless serving node, comprising:
 receiving, at a wireless serving node, a wireless session inquiry from an associated wireless serving node;
 determining whether the serving node is managing a wireless session associated with the session inquiry;
 generating a wireless session response containing an identifier for the serving node if the serving node is managing a wireless session associated with the session inquiry;
 determining the time elapsed since receiving the wireless session inquiry; and
 generating a second wireless session inquiry if a predetermined amount of time has elapsed, the second wireless inquiry directed to a different group of serving nodes than the first wireless session inquiry determining whether a wireless session response associated with the second session inquiry has been received.

52. A set of logic for selecting a serving node, the logic encoded in media and operable to:

receive a wireless session inquiry at a wireless serving node;

determine whether the serving node is managing a wireless session associated with the session inquiry;

generate a wireless session response containing an identifier for the serving node if the serving node is managing a wireless session associated with the session inquiry;

receive a wireless registration request associated with the session response; and generate a wireless registration response indicating acceptance of the registration request, wherein an identifier of a mobile unit is analyzed in order to determine the identifier for the serving node that could potentially service the mobile unit, wherein it is determined whether the registration request is associated with an active wireless session; and the establishment of a wireless session is initiated if the registration request is not associated with an active wireless session.

53. A set of logic for selecting a serving node, the logic encoded in media and operable to:

receive a wireless session inquiry at a wireless serving node;

determine whether the serving node is managing a wireless session associated with the session inquiry;

generate a wireless session response containing an identifier for the serving node if the serving node is managing a wireless session associated with the session inquiry;

determine the time elapsed since receiving the wireless session inquiry; and generate a second wireless session inquiry if a predetermined amount of time has elapsed, the second wireless inquiry directed to a different group of serving nodes than the first wireless session inquiry determining whether a wireless session response associated with the second session inquiry has been received; and relaying the session response to the group of serving nodes from which the first session inquiry originated if the session response has been received.

\* \* \* \* \*

UNITED STATES PATENT AND TRADEMARK OFFICE
CERTIFICATE OF CORRECTION

PATENT NO. : 6,975,863 B1  
APPLICATION NO. : 10/015334  
DATED : December 13, 2005  
INVENTOR(S) : Jerzy W. Miernik Page 1 of 1

It is certified that error appears in the above-identified patent and that said Letters Patent is hereby corrected as shown below:

Column 20, Line 65, after "received", delete ".", and insert -- ; and relaying the session response to the group of serving nodes from which the first session inquiry originated if the session response has been received. --.

Signed and Sealed this

Thirtieth Day of January, 2007

JON W. DUDAS  
*Director of the United States Patent and Trademark Office*